US012774240B2

(12) United States Patent
Bilenberg et al.

(10) Patent No.: US 12,774,240 B2
(45) Date of Patent: Oct. 27, 2026

(54) ELECTROSTATIC CLAMPING OF ELECTRICALLY INSULATING SUBSTRATES

(71) Applicant: NIL Technology ApS, Kongens Lyngby (DK)

(72) Inventors: Brian Bilenberg, Ølstykke (DK); Sören Fricke, Zofingen (CH); Lars Hagedorn Frandsen, Tårnby (DK)

(73) Assignee: NIL Technology ApS (DK)

( * ) Notice: Subject to any disclaimer, the term of this patent is extended or adjusted under 35 U.S.C. 154(b) by 154 days.

(21) Appl. No.: 18/834,177

(22) PCT Filed: Feb. 1, 2023

(86) PCT No.: PCT/EP2023/052481
§ 371 (c)(1),
(2) Date: Jul. 29, 2024

(87) PCT Pub. No.: WO2023/148236
PCT Pub. Date: Aug. 10, 2023

(65) Prior Publication Data
US 2025/0145514 A1 May 8, 2025

Related U.S. Application Data

(60) Provisional application No. 63/305,499, filed on Feb. 1, 2022.

(51) Int. Cl.
*C03B 19/14* (2006.01)
*H02N 13/00* (2006.01)

(52) U.S. Cl.
CPC ......... *C03B 19/1484* (2013.01); *H02N 13/00* (2013.01)

(58) Field of Classification Search
CPC . C03B 19/1484; H02N 13/00; H10P 72/0446; H10P 72/72
USPC .......................................................... 361/234
See application file for complete search history.

(56) References Cited

U.S. PATENT DOCUMENTS

2016/0011340 A1* 1/2016 Hong .................. G02B 3/0006 359/619
2017/0146806 A1 5/2017 Lin et al.
2017/0219739 A1 8/2017 Lin et al.
2019/0304818 A1* 10/2019 Ahn ................... H10P 72/0446
(Continued)

FOREIGN PATENT DOCUMENTS

EP 3816676 5/2021
EP 3855246 7/2021
(Continued)

OTHER PUBLICATIONS

Machine translation of Kawabata et al. Japanese Patent Document Jp H11-163110 A Jun. 1999 (Year: 1999).*
(Continued)

*Primary Examiner* — Kevin J Comber
(74) *Attorney, Agent, or Firm* — Fish & Richardson P.C.

(57) ABSTRACT

In an example implementation, an apparatus includes an electrically insulating substrate, optical elements in or on the substrate, and electrically conductive material on a surface of the substrate and laterally surrounding at least some of the optical elements. The electrically conductive material facilitates clamping of the electrically insulating substrate to an electrostatic chuck.

14 Claims, 7 Drawing Sheets

(56) References Cited

U.S. PATENT DOCUMENTS

| | | | |
|---|---|---|---|
| 2020/0225386 | A1 | 7/2020 | Tsai et al. |
| 2020/0271941 | A1 | 8/2020 | Riley, Jr. et al. |
| 2020/0355913 | A1 | 11/2020 | Park et al. |
| 2021/0028215 | A1 | 1/2021 | Devlin et al. |
| 2021/0103075 | A1 | 4/2021 | Park et al. |
| 2021/0247549 | A1 | 8/2021 | Park et al. |

FOREIGN PATENT DOCUMENTS

| | | | |
|---|---|---|---|
| EP | 3872538 | | 9/2021 |
| EP | 3968059 | | 3/2022 |
| JP | H11163110 A | * | 6/1999 |
| WO | WO 2017/176921 | | 10/2017 |
| WO | WO 2018/071870 | | 4/2018 |
| WO | WO 2018/204856 | | 11/2018 |
| WO | WO 2020/223399 | | 11/2020 |

OTHER PUBLICATIONS

International Search Report and Written Opinion in International Appln. No. PCT/EP2023/052481, mailed on Apr. 6, 2023, 14 pages.

International Preliminary Report on Patentability in International Appln. No. PCT/EP2023/052481, mailed on Aug. 15, 2024, 11 pages.

* cited by examiner 12
14
16
10

12
14
10
14
16

10
18
12
14
16
2B 12
18
14
10
18

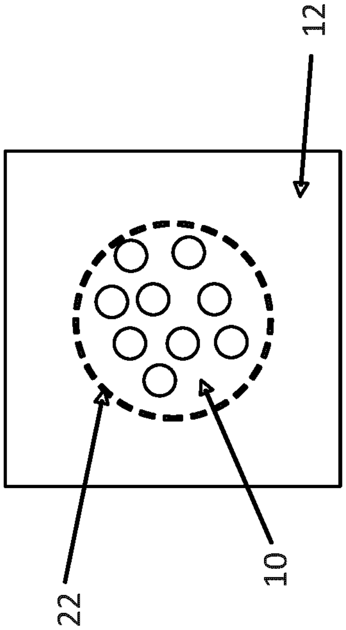
FIG. 4C
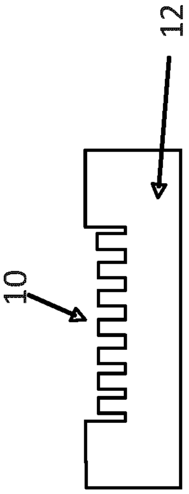
FIG. 4D
FIG. 4A
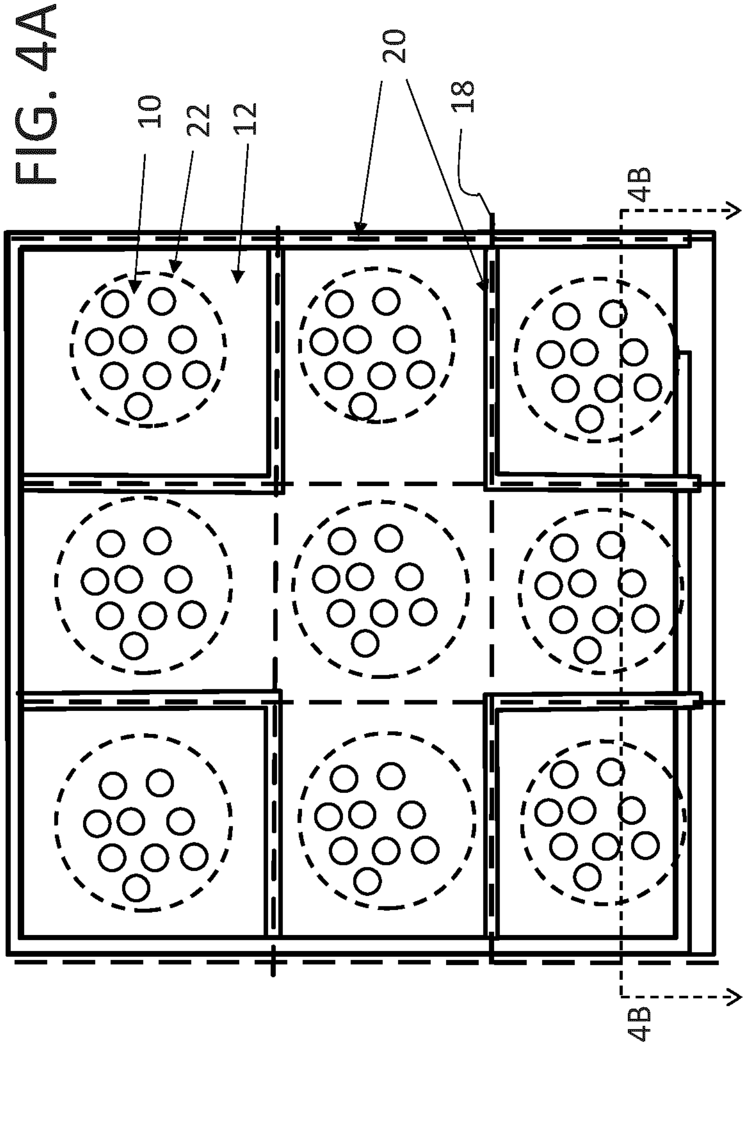
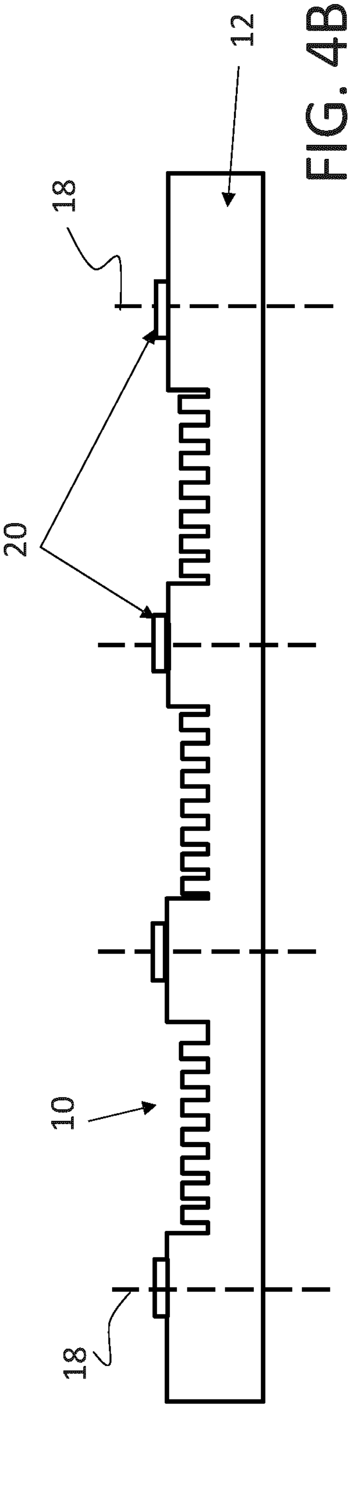
FIG. 4B

ELECTROSTATIC CLAMPING OF ELECTRICALLY INSULATING SUBSTRATES

CROSS-REFERENCE TO RELATED APPLICATIONS

This application is a National Stage application under 35 U.S.C. § 371 of International Application No. PCT/EP2023/052481, filed on Feb. 1, 2023, which claims the benefit of priority from U.S. Provisional Patent Application No. 63/305,499, filed on Feb. 1, 2022, the contents and disclosures of which are incorporated herein by reference in their entirety.

FIELD OF THE DISCLOSURE

The present disclosure relates to electrostatic clamping of electrically insulating substrates.

BACKGROUND

Electrostatic chucks can be used to clamp electrically conductive substrates (e.g., semiconducting wafers) during processing, such as lithography, ion implantation, plasma etching, film deposition, and inspection. A chuck and an electrically conductive substrate are attracted to each other via an electrostatic force. This electrostatic clamping technique, however, may not be effective for electrically insulating substrates, such as glass or amorphous silicon wafers.

SUMMARY

The present disclosure describes methods and apparatus to facilitate electrostatic clamping of electrically insulating substrates.

For example, in one aspect, the present disclosure describes a method that includes clamping an electrically insulating substrate to an electrostatic chuck, wherein a surface of the electrically insulating substrate has electrically conductive material thereon, and wherein the electrically conductive material forms at least one of rings, lines or a grid on the surface. The method also includes performing at least one process to the electrically insulating substrate while it is clamped to the chuck.

Some implementations include one or more of the following features. For example, in some implementations, the electrically conductive material provides an electrically conductive surface that interacts with the electrostatic chuck. In some cases, performing at least one process to the electrically insulating substrate includes forming optical elements in or on the substrate. In some cases, performing at least one process to the electrically insulating substrate includes performing at least one of lithography, ion implantation, plasma etching, or film deposition. In some instances, the electrically conductive material defines at least one of an optical aperture, an optical stop or an eye-safety circuit for the optical elements.

The present disclosure also describes an apparatus that includes an electrically insulating substrate, a plurality of optical elements in or on the substrate, and electrically conductive material on a surface of the substrate and laterally surrounding at least some of the optical elements. The apparatus also includes an electrostatic chuck, wherein the electrically insulating substrate is clamped to the electrostatic chuck, and wherein the electrically conductive material provides an electrically conductive surface to facilitate electrostatic clamping to the electrostatic chuck.

Some implementations include one or of the following features. For example, in some implementations, the electrically conductive material forms a plurality of rings of light-blocking material each of which laterally surrounds a respective one of the optical elements, wherein at least some of the rings of light-blocking material are connected electrically to each other. In some cases, the electrically conductive material comprises black chrome. In some implementations, the electrically conductive material forms a plurality of field stops of light-blocking material each of which laterally surrounds a respective one of the optical elements, wherein at least some of the field stops are connected electrically to each other. In some implementations, the electrically conductive material forms at least part of an eye-safety circuit. In some cases, the electrically conductive material comprises indium tin oxide. In some instances, the electrically conductive material forms a plurality of grids each of which laterally surrounds a respective one of the optical elements. In some instances, the electrically conductive material forms a grid that laterally surrounds the plurality of optical elements. In some cases, the electrically conductive material comprises a material selected from a group consisting of: a transition metal, a noble metal, any alloy or compound including at least one of a transition metal or a noble metal.

In some implementations, the optical elements are selected from a group consisting of: diffractive optical elements, meta-optical elements, microlens arrays, refractive optical elements. In some implementations, the substrate is composed of glass or an amorphous silicon wafer.

The present disclosure also describes an apparatus that includes an electrically insulating substrate, a plurality of optical elements in or on a first side of the substrate, and electrically conductive material forming a grid on a second side of the substrate, the second side being an opposite side of the substrate from the first side. The apparatus also includes an electrostatic chuck, wherein the electrically insulating substrate is clamped to the electrostatic chuck, and wherein the electrically conductive material provides an electrically conductive surface to clamp the substrate electrostatically to the electrostatic chuck.

In some implementations, the techniques described here can help improve electrostatic clamping, including local clamping.

Other aspects, features and advantages will be readily apparent from the following detailed description, the accompanying drawings, and the claims.

BRIEF DESCRIPTION OF THE DRAWINGS

FIGS. 4A-4D depict another implementation of the electrically conductive grid.

DETAILED DESCRIPTION

Figures 1A, 1B, 1C, 1D:
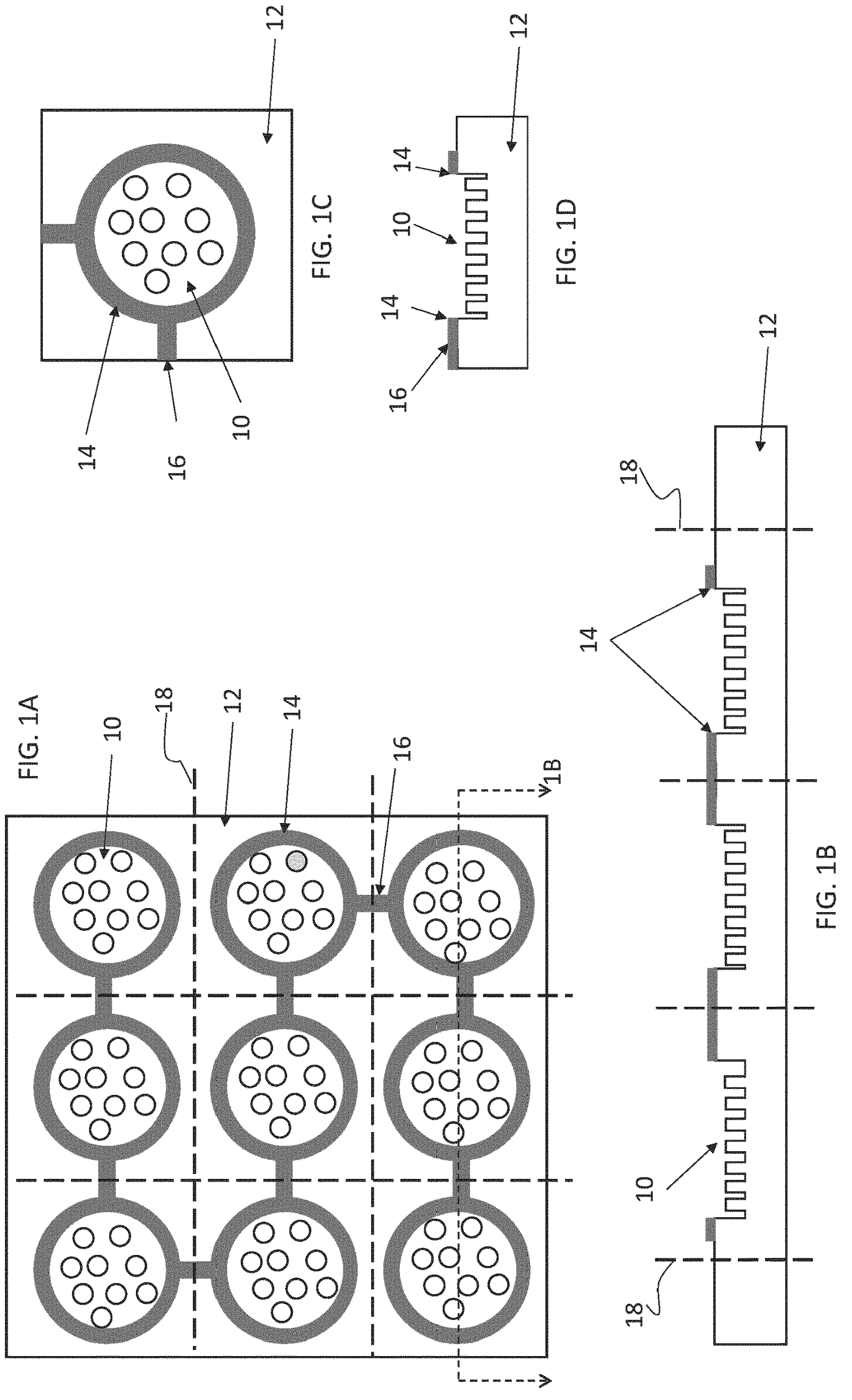
FIGS. 1A-1D depict an implementation in which an electrically conductive optical feature is provided on an electrically insulating substrate and is used to provide an electrically conductive surface such that the electrically insulating substrate can be clamped to an electrostatic chuck.
Figures 2A, 2B, 2C, 2D:
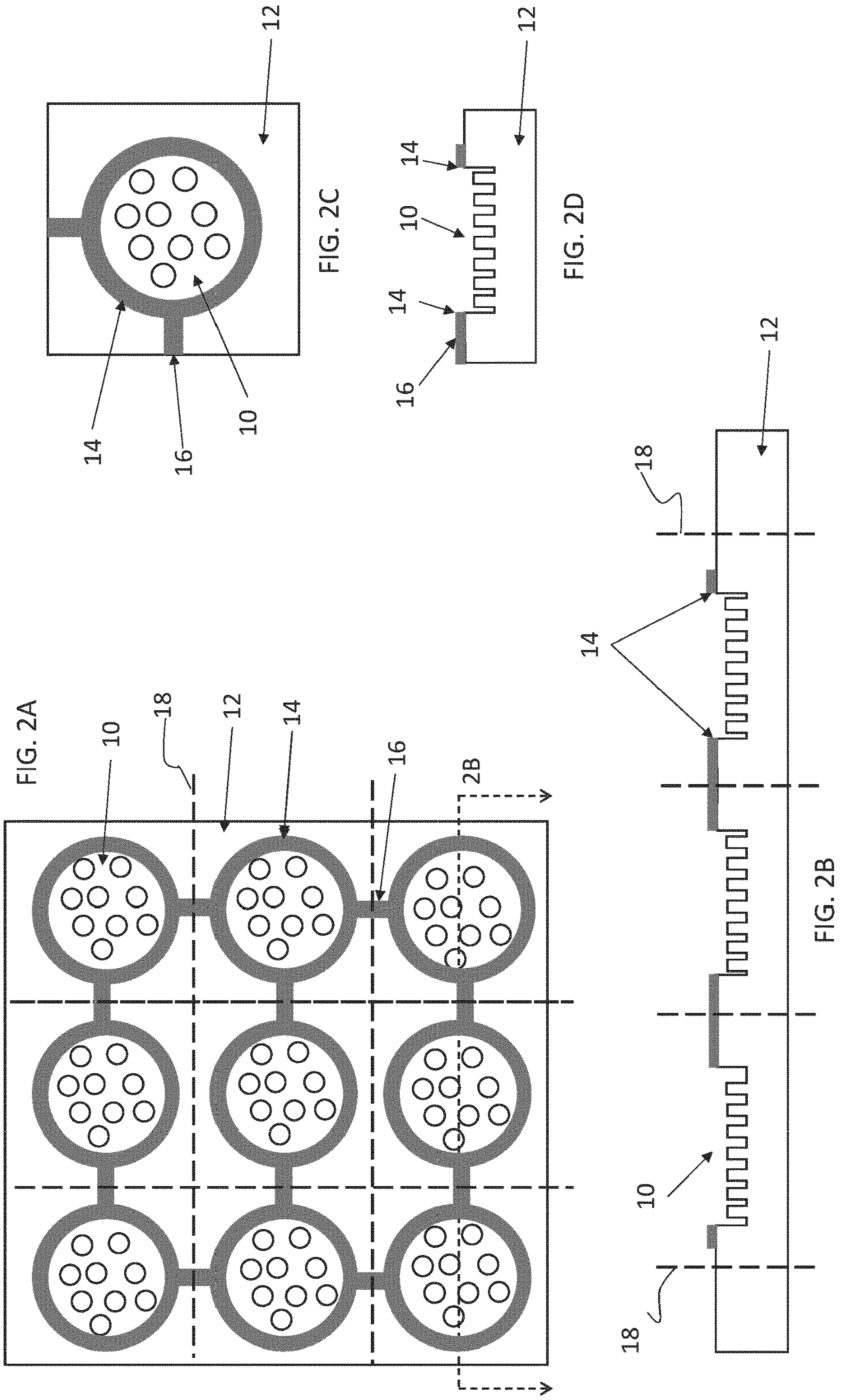
FIGS. 2A-2D depict another implementation of the electrically conductive optical feature.

FIG. 1A (top view) and FIG. 1B (side view) depict an array of individual optical elements (e.g., a diffractive optical element, meta-optical element, microlens array, or refractive optical element) 10 in or on an electrically insulating substrate 12. The electrically insulating substrate 12 can be composed, for example, of a glass wafer. In some implementations, the optical elements 10 are formed in a relatively thin film composed, e.g., of silicon on the upper surface of the glass wafer. In the illustrated example, each of the optical elements 10 is surrounded laterally by a respective electrically conductive optical feature 14.

The electrically conductive optical feature(s) 14 can be, for example, a ring of light-blocking and electrically conducting material, such as black chrome that defines an aperture. In some instances, the ring may be composed of a material that blocks, for example, radiation in the range of 300 nm-1580 nm. In some embodiments, the electrically conductive feature(s) may be a field stop (or other optical stop) composed of a light-blocking and electrically conductive material. In some embodiments, the electrically conductive feature(s) may be an eye-safety circuit (i.e., a trace of electrically conducting material designed to generate an electrical response to an eye-un-safe condition, such as a fracture in the optical element). Such an eye-safety circuit may be composed, for example, of a substantially transparent, electrically conductive material, such as indium tin oxide (ITO).

The electrically conductive optical features 14 can be connected electrically to each other, for example, via electrically conductive connectors 16. The connectors 16 may be composed, for example, of the same material as the electrically conductive optical features 14. The connectors 16 together with the electrically conductive optical features 14 can be configured to permit the electrically insulating substrate to be clamped electrostatically to an electrostatic chuck. Processes (e.g., etching) may be performed on the array of individual optical elements 10 while the substrate 12 is clamped, and the array subsequently may be separated (e.g., by dicing along dicing lines 18) into discrete optical components as depicted, for example, in FIG. 1C (top view) and FIG. 1D (side view).

FIG. 2A-2D depict another implementation of the array of individual optical elements 10 with electrically conductive optical features 14. In this implementation, the connectors 16 electrically connect only some of the optical features 14.

Figures 3A, 3B, 3C, 3D:
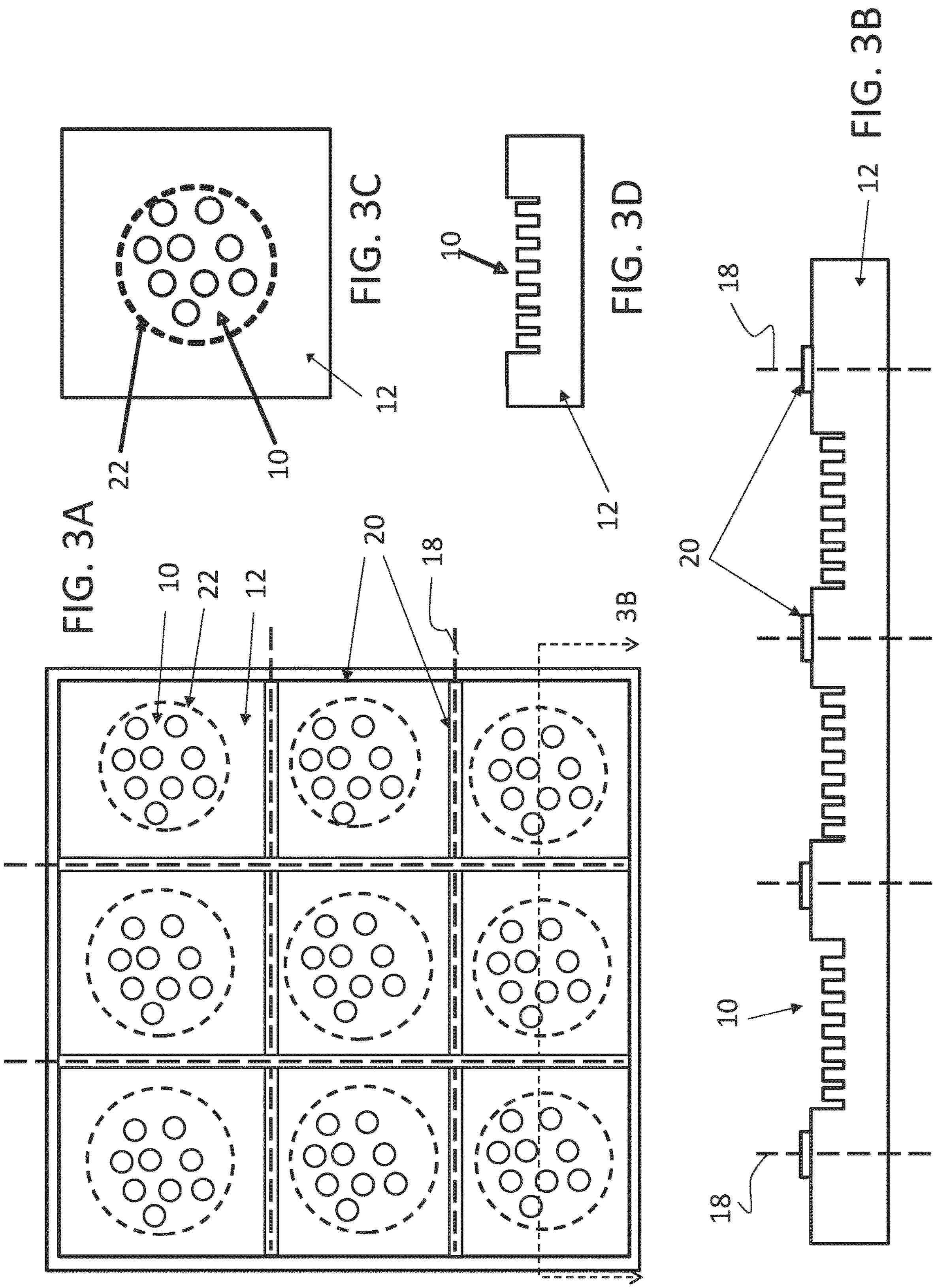
FIGS. 3A-3D depict an implementation in which an electrically conductive grid is used to provide an electrically conductive surface configured to interact with an electrostatic chuck such that the electrically insulating substrate can be clamped to the electrostatic chuck.
Figure 5C:
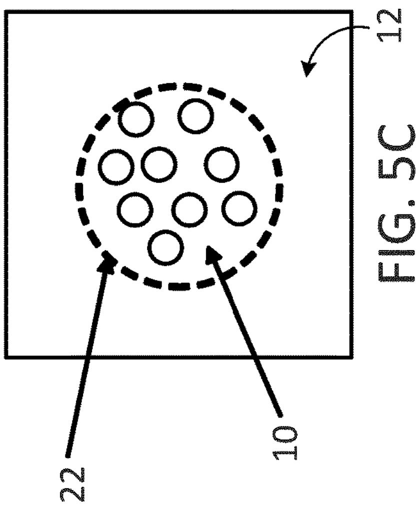
FIGS. 5A-5D depict another implementation of the electrically conductive grid.
Figure 5D:
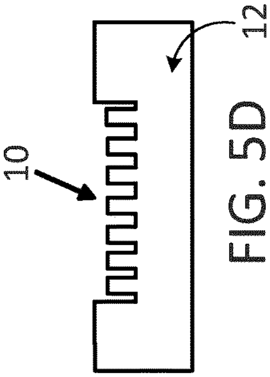
Figure 5A:
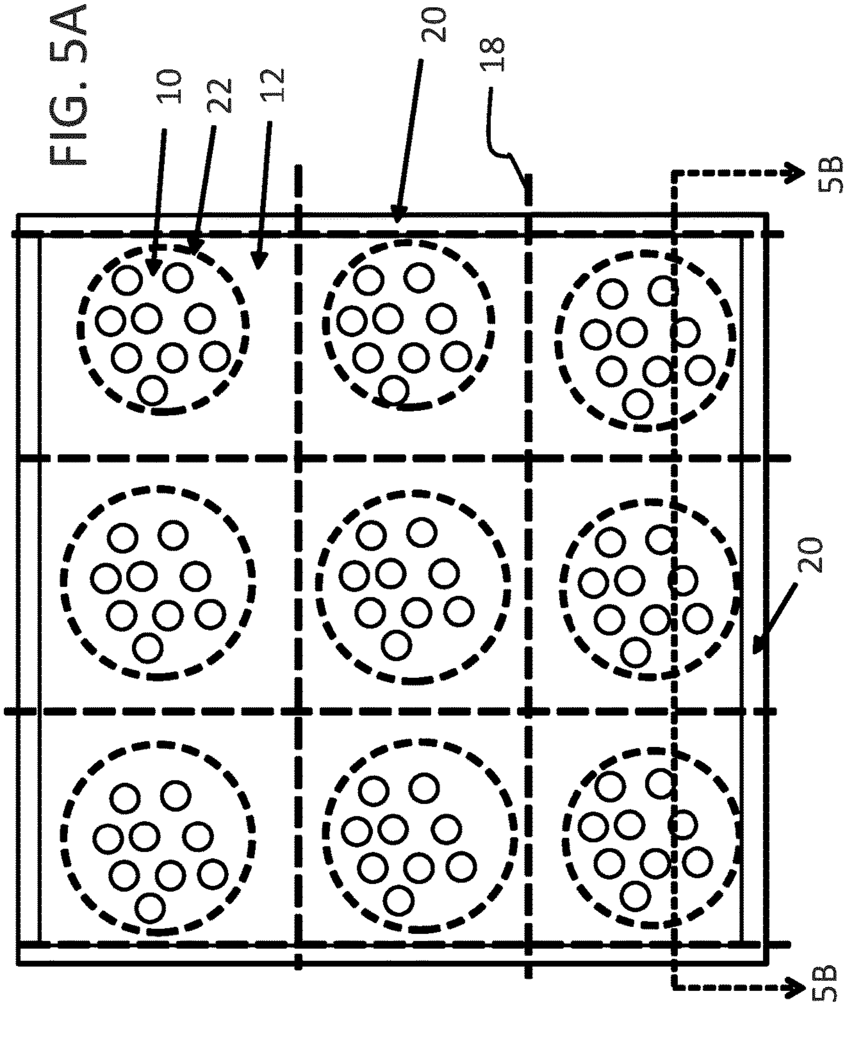
Figure 5B:
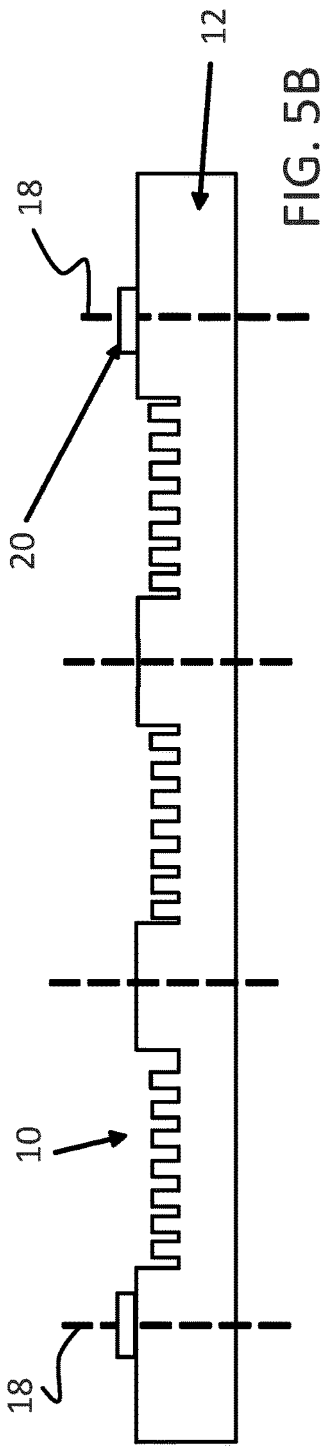

FIG. 3A (top view) and FIG. 3B (side view) depict an array of individual optical elements (e.g., a diffractive optical element, meta-optical element, microlens array, or refractive optical element) 10 on an electrically insulating substrate 12. Each of the optical elements is at least partially surrounded laterally by a respective electrically conductive lines 20, which in some cases may form a grid. In this example, the electrically conductive lines 20 form a grid of electrically conducting material at least partially surrounding laterally the active optical area 22 of each individual optical element 10 within the array.

The electrically conductive lines 20, which in some cases may form a grid, may be composed of any electrically conductive material, such as transition metals, noble metals, or any alloy or compound including such materials. The one or more electrically conductive grids 20 are configured to permit the electrically insulating substrate to be clamped electrostatically to an electrostatic chuck. Processes (e.g., etching) may be performed on the array of individual optical elements 10 while the substrate 12 is clamped, and the array subsequently may be divided (e.g., by dicing along dicing lines 18) into discrete optical components as depicted in FIGS. 3C (top view) and 3D (side view). In some instances, the electrically conductive grid may be completely diced away, whereas in other instances, traces of the electrically conductive grid may still be present after dicing the array of optical elements into discrete components.

Although in FIG. 3A each optical element 10 is surrounded laterally by electrically conducting material 20, in other implementations only some of the optical elements 10 may be surrounded individually by electrically conductive material (see, e.g., FIG. 4). In some implementations the entire array of optical elements 10 may be surrounded by a single grid of electrically conductive material 20 (as in FIG. 5).

The illustrated examples show the electrically conductive optical feature 14 or the electrically conductive lines 20 on the same side of the substrate as the optical element 10. However, in some implementations, the electrically conductive optical features 14 or the electrically conductive lines 20 may be on the side of the insulating substrate 12 opposite the side on which the optical elements 10 is disposed.

Figure 6:
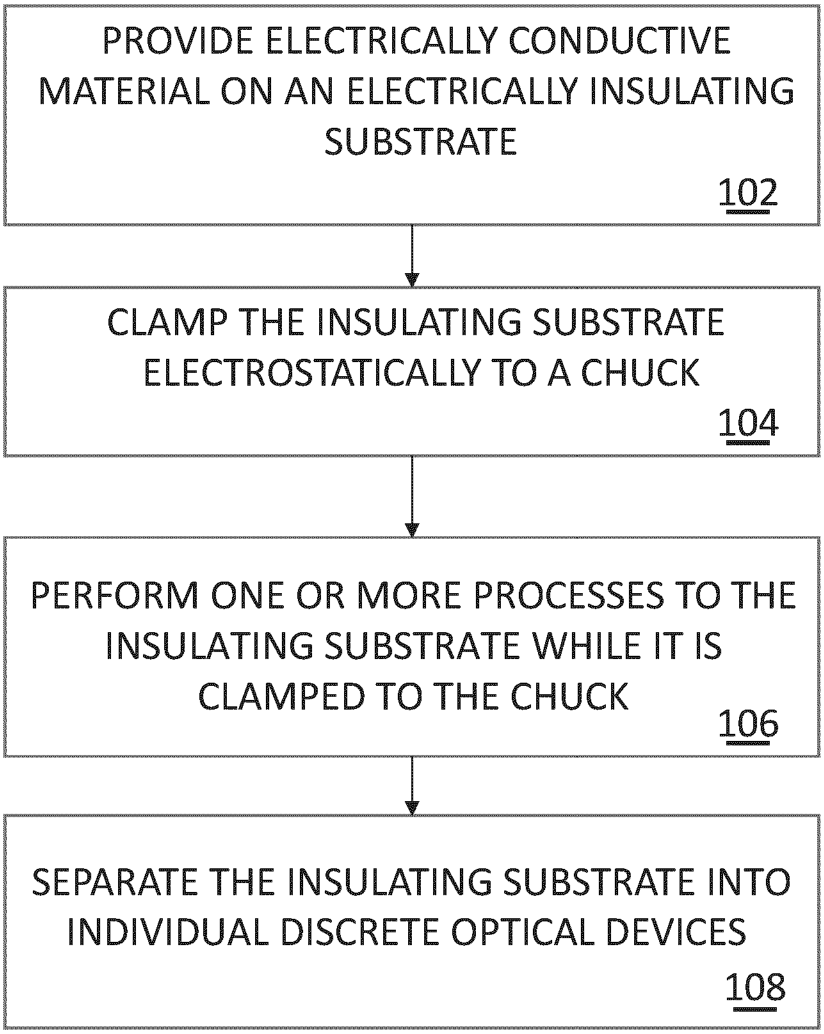
FIG. 6 is a flow chart showing operations in an example method.
Figure 7:
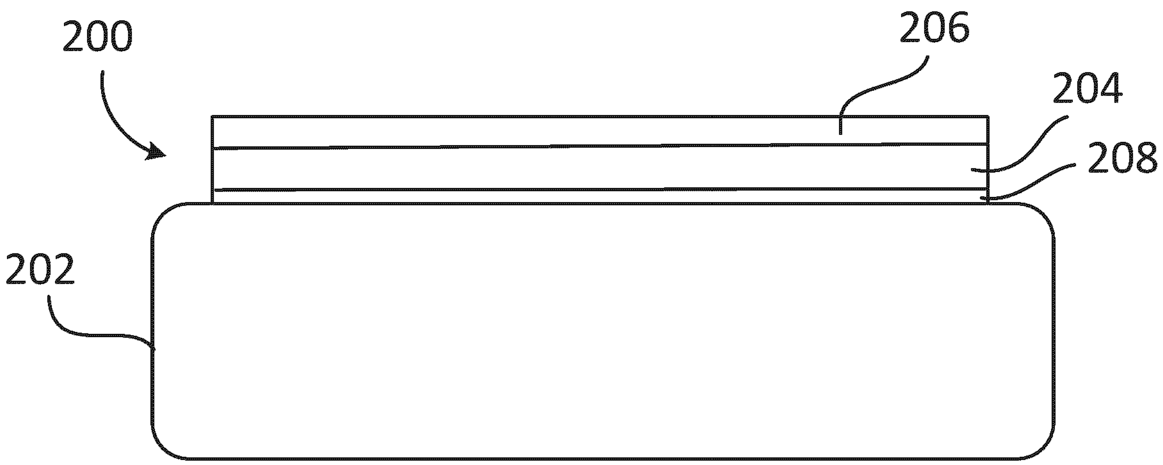
FIG. 7 shows an example of an insulating substrate clamped electrostatically to a chuck.

FIG. 6 is a flow chart illustrating operations in an example method in accordance with the present disclosure. As indicated by 102, electrically conductive material is provided on an electrically insulating substrate. In some implementations, the electrically conductive material is provided on a front side of the substrate to form optical feature(s) (e.g., an optical aperture, an optical stop, or an eye-safety circuit) or lines (e.g., a grid) as described above. In some implementations, the electrically conductive material is provided on a backside of the substrate. The electrically conductive material on the backside of the substrate can take the form, for example, of rings or lines (e.g., a grid). That is, the electrically conductive material may cover only a portion of the front side or backside. As indicated by 104, the insulating substrate is clamped electrostatically to a chuck. An example is illustrated in FIG. 7, which shows an electrically insulating substrate 200 clamped electrostatically to a chuck 202. The substrate 200 can include, for example, a glass wafer 204 on which a silicon or other thin film 206 is disposed. The electrically conductive material 208 on the insulating substrate 200 provides an electrically conductive surface that interacts with the electrostatic chuck 202. Subsequently, as indicated by 106, one or more processes are performed with respect to the insulating substrate while it is clamped to the chuck. The processes performed to the substrate can include, for example, lithography, ion implantation, plasma or other etching, and/or film deposition. Such processes can be used, for example, to form the array of optical elements in or on the insulating substrate. For example, in some instances, the silicon film 206 is etched to form meta-optical elements such as meta-lenses. In some instances, if not already present, other features such as optical apertures may be provided for the optical elements. As indicated by 108, the insulating substrate can be separated (e.g., by dicing) into individual discrete devices each of which includes an optical element.

Other implementations also are within the scope of the claims.

What is claimed is:

1. An apparatus comprising:

an electrically insulating substrate;

a plurality of optical elements in or on the substrate;

electrically conductive material on a surface of the substrate and laterally surrounding at least some of the optical elements, an electrostatic chuck, wherein the electrically insulating substrate is clamped to the electrostatic chuck, and wherein the electrically conductive material provides an electrically conductive surface to facilitate electrostatic clamping to the electrostatic chuck.

2. The apparatus of claim 1 wherein the electrically conductive material forms a plurality of rings of light-blocking material each of which laterally surrounds a respective one of the optical elements, wherein at least some of the rings of light-blocking material are connected electrically to each other.

3. The apparatus of claim 2 wherein the electrically conductive material comprises black chrome.

4. The apparatus of claim 1 wherein the electrically conductive material forms a plurality of field stops of light-blocking material each of which laterally surrounds a respective one of the optical elements, wherein at least some of the field stops are connected electrically to each other.

5. The apparatus of claim 1 wherein the electrically conductive material forms at least part of an eye-safety circuit.

6. The apparatus of claim 5 wherein the electrically conductive material comprises indium tin oxide.

7. The apparatus of claim 1 wherein the electrically conductive material forms a plurality of grids each of which laterally surrounds a respective one of the optical elements.

8. The apparatus of claim 7, wherein the electrically conductive material comprises a material selected from a group consisting of: a transition metal, a noble metal, any alloy or compound including at least one of a transition metal or a noble metal.

9. The apparatus of claim 1 wherein the electrically conductive material forms a grid that laterally surrounds the plurality of optical elements.

10. The apparatus of claim 1, wherein the optical elements are selected from a group consisting of: diffractive optical elements, meta-optical elements, microlens arrays, refractive optical elements.

11. The apparatus of claim 1, wherein the substrate is composed of glass or an amorphous silicon wafer.

12. A method comprising:

clamping an electrically insulating substrate to an electrostatic chuck, wherein a surface of the electrically insulating substrate has electrically conductive material thereon, wherein the electrically conductive material forms at least one of rings, lines or a grid on the surface, wherein the electrically conductive material provides an electrically conductive surface that interacts with the electrostatic chuck, and wherein the electrically conductive material defines at least one of an optical aperture, an optical stop or an eye-safety circuit; and performing at least one process to the electrically insulating substrate while it is clamped to the chuck.

13. The method of claim 12, wherein performing at least one process to the electrically insulating substrate includes forming optical elements in or on the substrate.

14. The method of claim 12, wherein the performing at least one process to the electrically insulating substrate includes performing at least one of lithography, ion implantation, plasma etching, or film deposition.

* * * * *